(12) United States Patent
Obersteiner

(10) Patent No.: US 7,685,935 B2
(45) Date of Patent: Mar. 30, 2010

(54) FOOD PROCESSOR WITH TOOLS COMBINED TO A TOOL UNIT

(75) Inventor: Heimo Obersteiner, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1190 days.

(21) Appl. No.: 10/539,329

(22) PCT Filed: Dec. 2, 2003

(86) PCT No.: PCT/IB03/05593

§ 371 (c)(1),
(2), (4) Date: Jun. 15, 2005

(87) PCT Pub. No.: WO2004/054418

PCT Pub. Date: Jul. 1, 2004

(65) Prior Publication Data

US 2007/0051249 A1 Mar. 8, 2007

(30) Foreign Application Priority Data

Dec. 16, 2002 (EP) ................................. 02102770

(51) Int. Cl.
*A47J 43/00* (2006.01)

(52) U.S. Cl. .............................. 99/509; 99/348; 99/510; 241/92; 241/282.2

(58) Field of Classification Search .................. 99/492, 99/497, 509–513, 348; 241/37.5, 92, 282.1, 241/282.2, 101.01, 101.2; 366/314–316, 366/291, 601, 205, 297–300
See application file for complete search history.

(56) References Cited

U.S. PATENT DOCUMENTS

| | | | | |
|---|---|---|---|---|
| 2,284,155 | A * | 5/1942 | Landgraf | 241/282.2 |
| 3,024,010 | A * | 3/1962 | Sperling | 366/314 |
| 3,156,278 | A * | 11/1964 | Otto | 241/282.2 |
| 4,190,208 | A | 2/1980 | Schaffer et al. | |
| 4,613,086 | A * | 9/1986 | Granum et al. | 241/101.8 |
| 4,784,338 | A * | 11/1988 | Saladin | 241/101.2 |
| 5,271,572 | A * | 12/1993 | Grandi | 241/199.2 |
| 6,012,837 | A * | 1/2000 | Thuma | 366/294 |
| 6,082,648 | A * | 7/2000 | Marriere et al. | 241/282.1 |
| 6,418,837 | B1 * | 7/2002 | Obersteiner | 99/509 |

* cited by examiner

*Primary Examiner*—Timothy F. Simone

(57) ABSTRACT

Provided in a food processor (1) is a driveable holder (13) for a tool unit (29), which tool unit (29) is equipped with multiple tools (26, 27, 28) and can be relocated in relation to the holder (13), so that one tool (26) at a time from the tool unit (29) can be brought into an operational position in the area of a window (25) in a holder wall (21) of the holder (13), and the other tools (27, 28) are hereby covered by the holder wall (21).

15 Claims, 5 Drawing Sheets

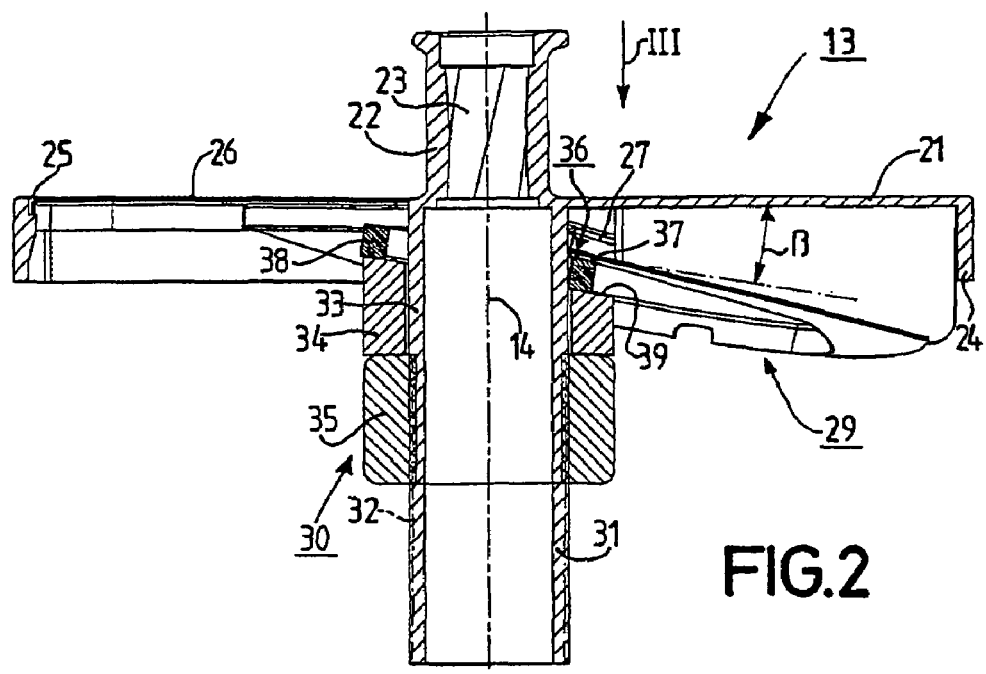
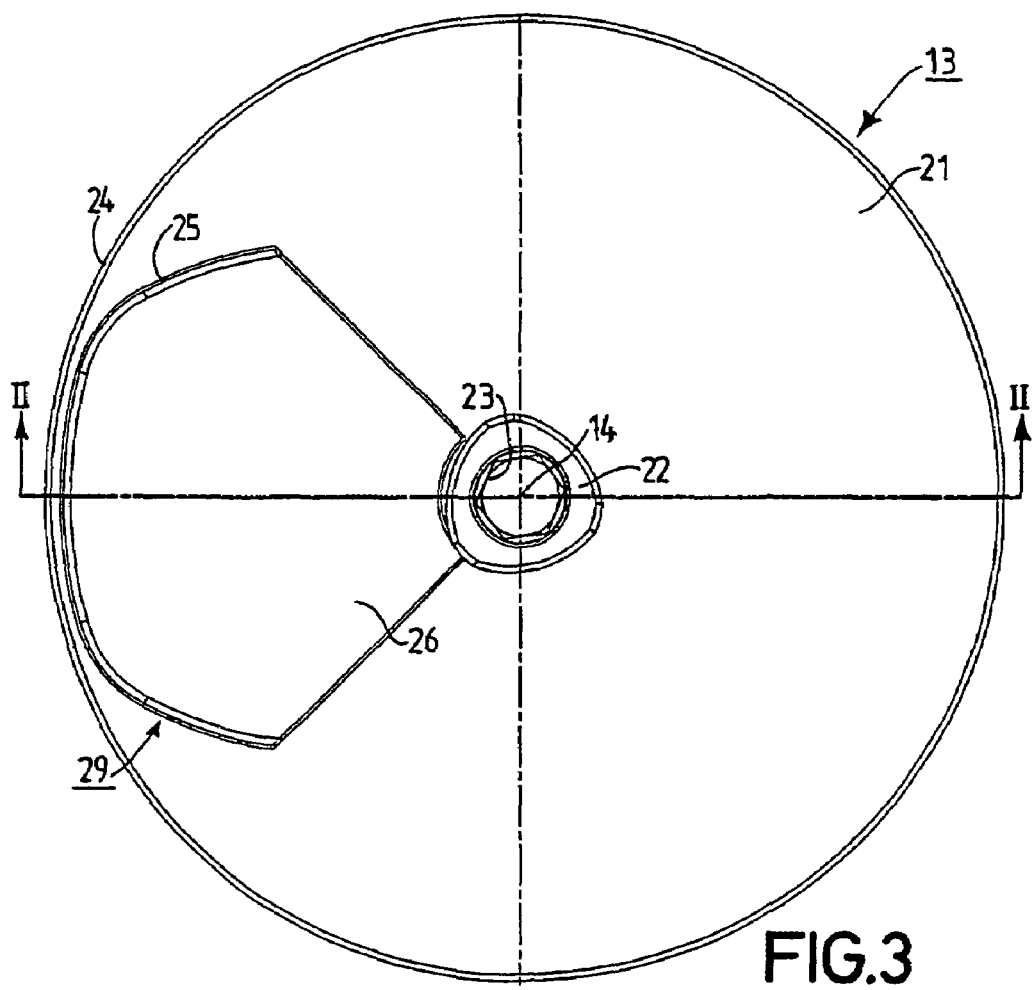

FOOD PROCESSOR WITH TOOLS COMBINED TO A TOOL UNIT

The invention relates to a food processor, which food processor is equipped with at least two tools for processing food, and which food processor (1) comprises driving means for driving the tools, and which food processor comprises a holder for holding the tools, which holder can be driven by the driving means and which holder is equipped with a holder wall and which holder has a window in the holder wall, in said window the tools held by the holder can be positioned one at a time.

A food processor of this kind, in accordance with the design cited in the first paragraph above, was disclosed in U.S. Pat. No. 4,190,208 A, and is therefore known. In the case of the known food processor, the design is such that one of multiple tools, as desired, can be connected to the essentially circular-disk shaped holder for holding the tools in that the particular tool selected for use is inserted into the holder in a radial direction, using a provided dovetail connection, as a result of which the particular tool selected is accommodated and positioned in the window provided in the holder wall of the holder. To fix the particular tool selected on the holder, a clamped connection is provided, which is realized by a sleeve and an essentially U-shaped clamping jaw. In the case of the known food processor, a separate tool is provided for each preparation process, which has to be connected to the holder in a separate connection step in order to undertake the particular preparation process. Apart from this rather complicated, awkward handling process, the problem also exists with the known food processor that a relatively large storage space is required for storing the individual tools, and that a storage space separate from the food processor is required for those tools not selected at the time.

It is an object of the invention to eliminate the above-mentioned problems and to realize an improved food processor.

In order to achieve the above-mentioned object, features in accordance with the invention are provided in a food processor in accordance with the invention, so that a food processor in accordance with the invention can be characterized as follows, namely:

A food processor, which food processor is equipped with at least two tools for processing food and which food processor comprises driving means for driving the tools, and which food processor comprises a holder for holding the tools, which holder can be driven by the driving means and which holder is equipped with a holder wall and which holder has a window in the holder wall, in said window the tools held by the holder can be positioned one at a time, and wherein the at least two tools are combined to form a tool unit, and wherein the tool unit is designed to be relocatable in relation to the holder, and wherein one tool at a time from the tool unit can be positioned in the window, in which case the at least one other tool is aligned facing towards the holder wall and covered by the holder wall, and wherein releasable fixing means are provided for fixing the tool unit to the holder.

Owing to the provision of the features in accordance with the invention, it is achieved in a structurally simple, space-saving manner, that, as the result of their being gathered together to form a single tool unit, multiple tools of a food processor can make do with an optimally small space requirement. Above all, however, it is achieved that each of the tools that are gathered together to form a tool unit can, in a very simple manner, be brought into the operational position in the area of the window in the holder wall of the holder. Further, the advantage is obtained with the food processor in accordance with the invention that the protected storage of the particular tools that are not positioned in the area of the window in the holder wall of the holder is enabled within the food processor, specifically directly adjacent to the food processor holder, wherein especially good protection is ensured by the holder wall that is present in any event, towards which holder wall the covered tools are aligned. It is further achieved that no storage space separate from the food processor is necessary for these tools. Further, an undesired disappearance or loss of a tool is prevented.

In a food processor in accordance with the invention, the holder may, for instance, be of a drum-shaped design, and hereby have in its cylindrically shaped holder wall the window for accommodating a tool from the tool unit, which tool unit is then essentially of a hollow cylindrical design. In a food processor in accordance with the invention, it has, however, proved extremely advantageous if the tool unit can be relocated essentially parallel with the holder wall following a releasing of the fixing means in relation to the holder. This is advantageous in respect of the most compact structural design possible.

In a food processor in accordance with the invention as described in the above paragraph, it has further proved extremely advantageous if, following a releasing of the fixing means in relation to the holder, the tool unit can be relocated essentially at right angles to the holder wall. This is advantageous in respect of the easiest possible operation in transferring one particular tool from the tool unit into the operating position in the area of the window in the holder wall of the holder.

In a food processor in accordance with the invention as described in the above two paragraphs, it has further proved extremely advantageous if the holder can be operated with the driving means so as to rotate about a holder axis, and has a holder wall running at right angles to the holder axis, and if, following the releasing of the fixing means, the tool unit can be rotated about the holder axis. This is advantageous in respect of the easiest possible operation of the holder and, consequently, of the tool unit. It should be mentioned, however, that a holder of a food processor can also be operated by means of a backwards and forwards motion.

In a food processor in accordance with the invention with a holder that can be operated to rotate about a holder axis, it has further proved advantageous if the holder is equipped with a positioning surface adjacent to the holder axis, which positioning surface is inclined in relation to the holder wall by an angle of inclination, and if the tool unit is equipped with a positioning ring to interact with the inclined positioning surface of the holder, and if the positioning ring can be fixed with the fixing means so as to rest against the inclined positioning surface, and wherein each tool from the tool unit is inclined at the angle of inclination in relation to the positioning ring. A design of this kind is advantageous in respect of a simplicity of operation to relocate the tool unit in relation to the holder in order to bring one tool at a time into its operating position. A design of this kind is further advantageous in respect of the easy, reliable fixing of the tool unit on the holder.

In a food processor in accordance with the invention as described in the previous paragraph, it has further proved advantageous if the fixing means are equipped with a threaded sleeve that is concentric with the holder axis and connected to the holder, and with a pressure sleeve that encloses the threaded sleeve and can be relocated along the threaded sleeve, and with a screw nut that can be relocated along the threaded sleeve by means of a screwing operation, and if the pressure sleeve is equipped with a contact surface inclined by the angle of inclination in relation to the holder wall, and if, with the aid of the contact surface of the pressure sleeve, the positioning ring can be held against the inclined positioning surface of the holder. A design of this kind has proved advantageous in respect of especially good fixing and also in respect of the easy releasing of the fixing.

It has further proved extremely advantageous if the tool unit contains three tools. A design of this kind has proved extremely favorable in practice. It should be mentioned, however, that a tool unit may also contain just two tools, or may contain four or five or, if applicable, even more tools.

The invention will be further described with reference to examples of embodiments shown in the drawings, to which, however, the invention is not restricted.

FIG. 2 shows, in a section through line II-II in FIG. 3 of the food processor in accordance with FIG. 1, a holder for a tool unit, including this tool unit.

FIG. 3 shows, in a view in accordance with arrow III in FIG. 2, the holder including the tool unit as shown in FIG. 2.

Figure 1:
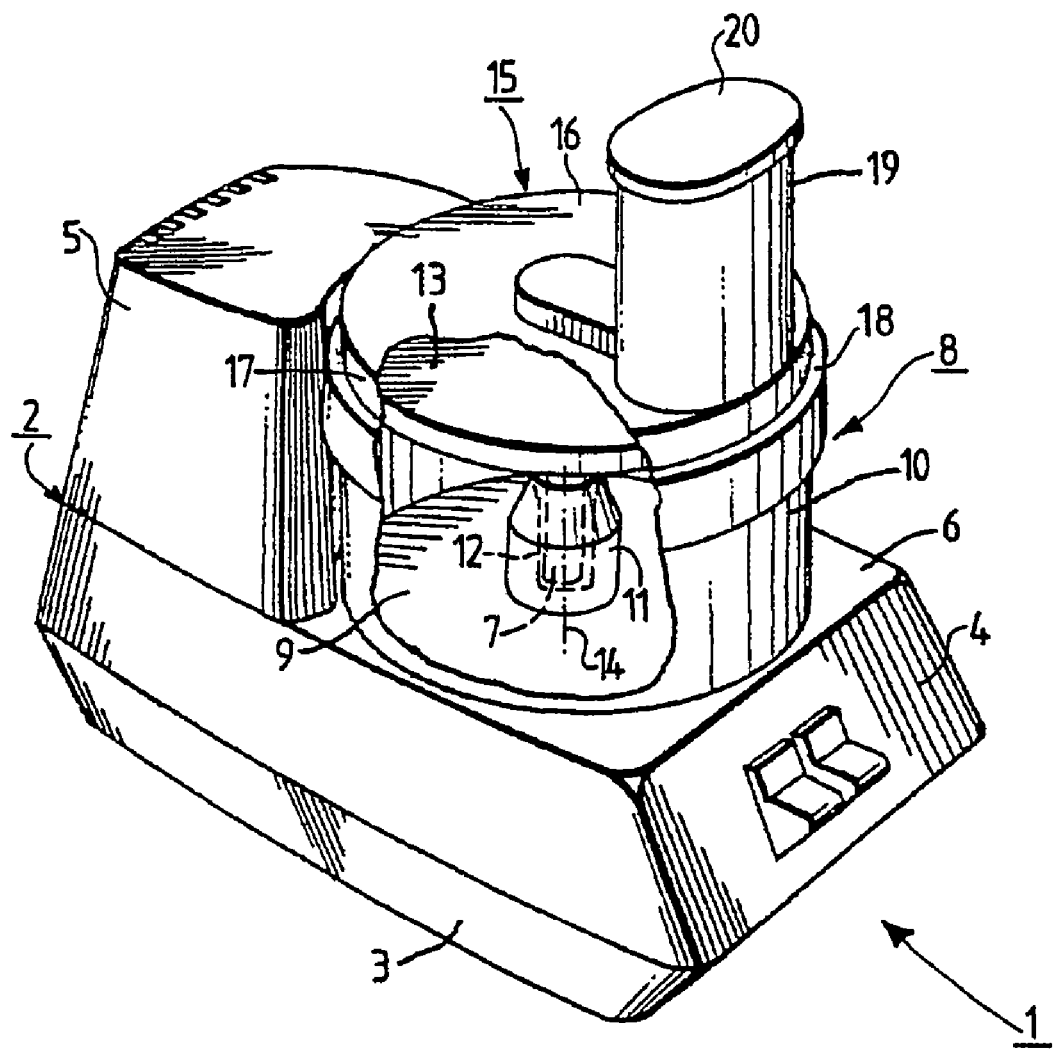
FIG. 1 shows, in an oblique view from above and in a partially simplified manner, a food processor in accordance with one embodiment of the invention.
Figure 4:
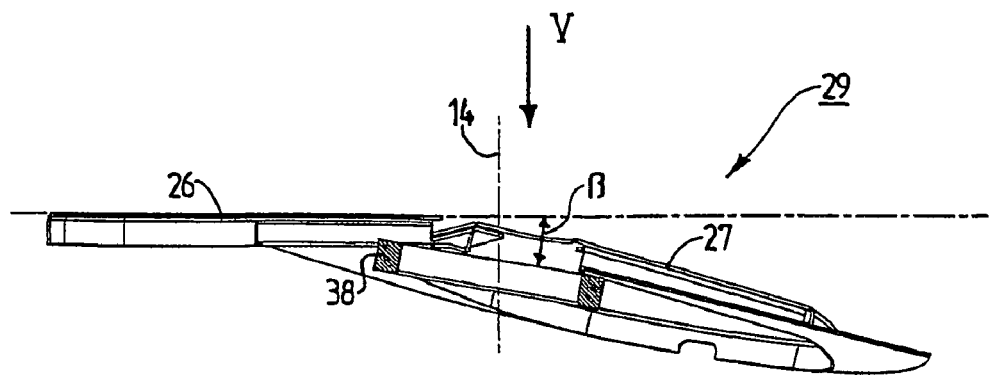
FIG. 4 shows, in a section through line IV-IV in FIG. 5, the tool unit of the food processor as shown in FIG. 1.
Figure 5:
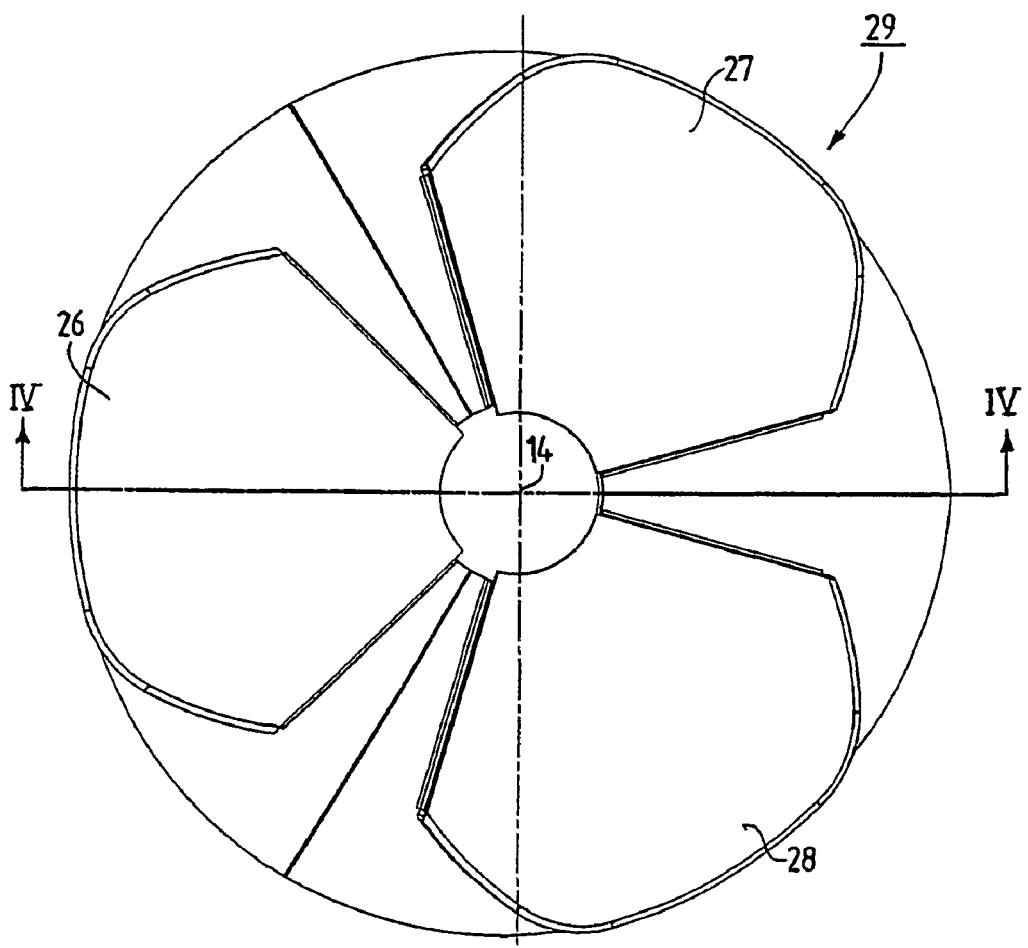
FIG. 5 shows, in a view in accordance with arrow V in FIG. 4, the tool unit as shown in FIG. 4.
Figure 6:
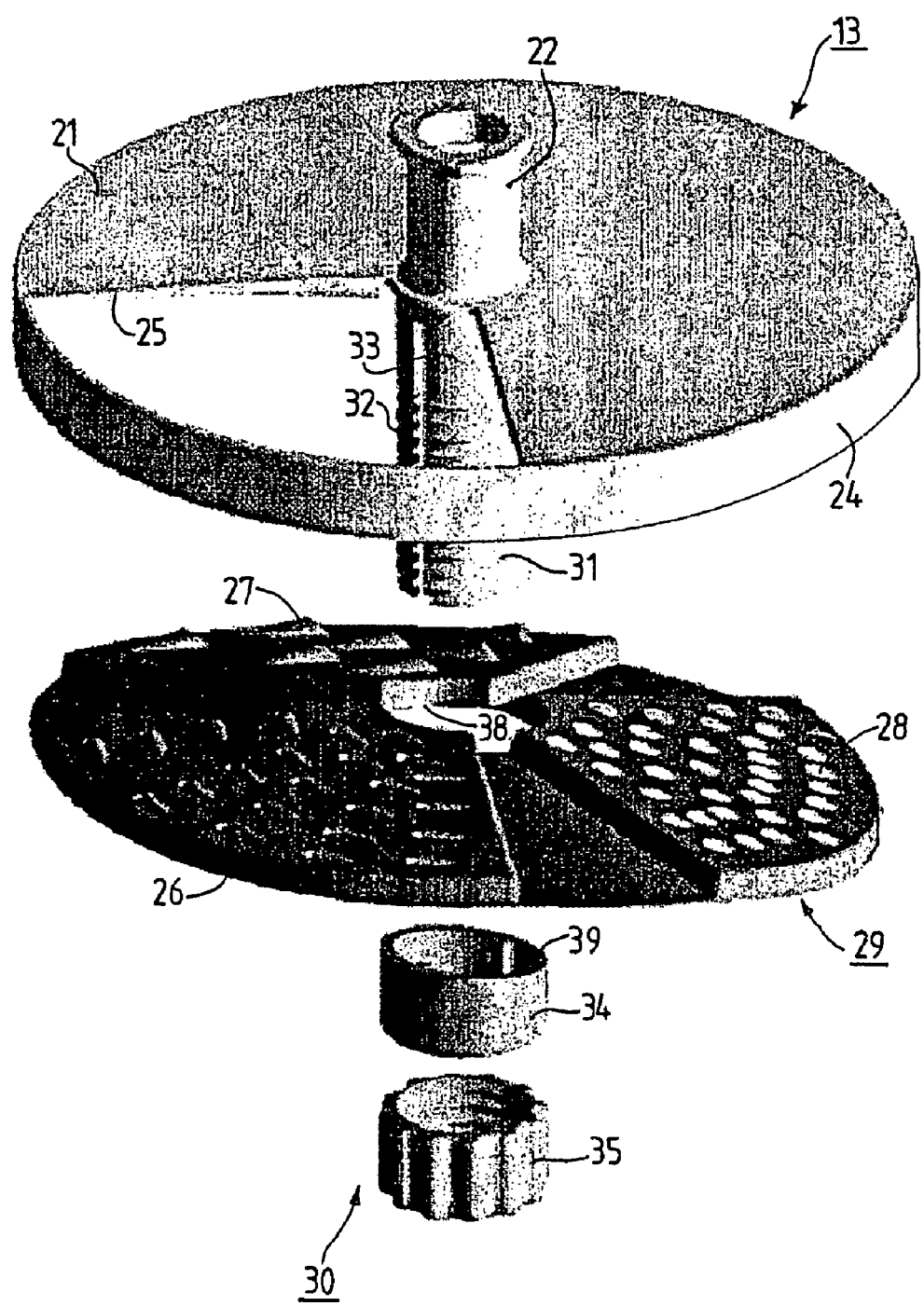
FIG. 6 shows, in an oblique view from above, the holder for the tool unit, including the tool unit and fixing means for the tool unit in an exploded state.
Figure 7:
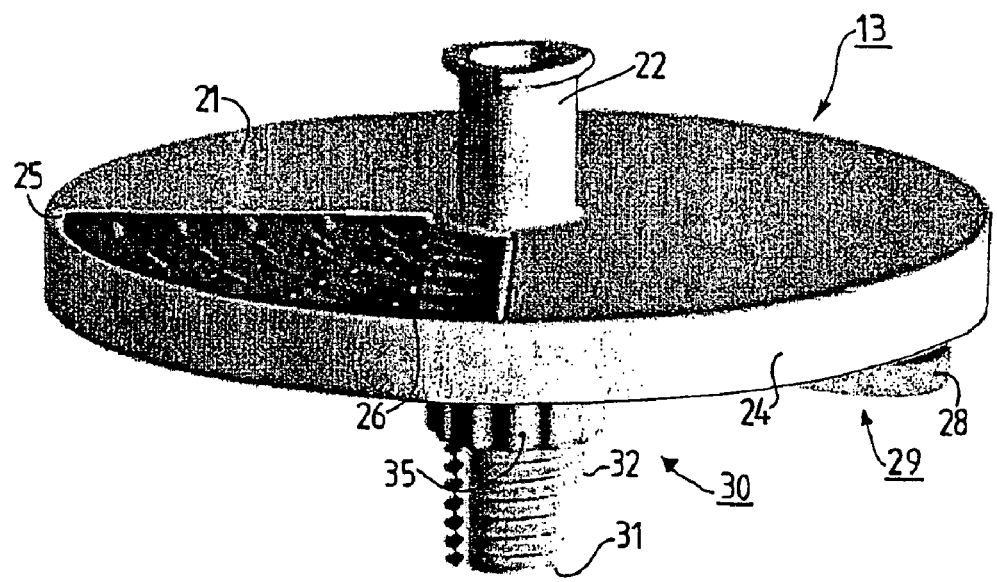
FIG. 7 shows, in an oblique view from above, the holder including the tool unit and the fixing means in an assembled state.
Figure 8:
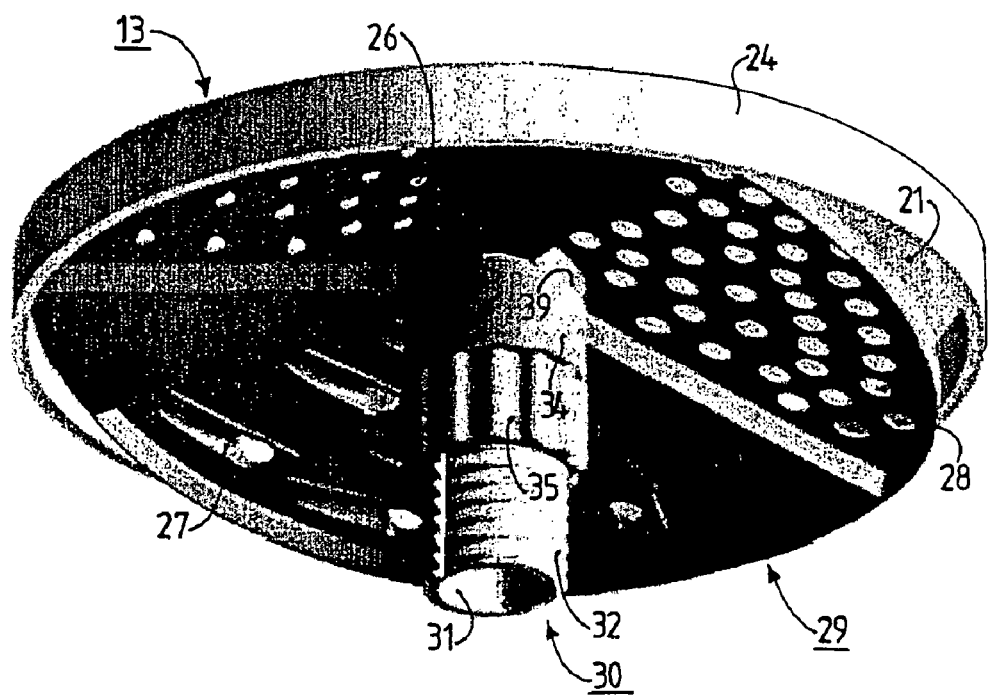
FIG. 8 shows, in a view from below, the holder including the tool unit and the fixing means in an assembled state.

FIG. 1 shows a food processor 1. The food processor 1 is provided and designed for processing food. For example, vegetables may be cut into thick or thin strips with the food processor, or vegetables may be grated into small shreds by grating. Furthermore, vegetables may be cut into slices.

The food processor 1 is equipped with a housing 2, which comprises a trough-shaped base section 3 and a top section 4 in the shape of an upside-down trough, and a tower-like side section 5 projecting from the top section 4. Accommodated in the housing area comprising the base section 3 and the top section 4 are driving means for operating tools of the food processor and an electrical-power supply circuit for the driving means. The driving means are equipped with an electric motor and a gearing that can be driven by the electric motor, which, however, are not shown in FIG. 1. The reason for this is that the specific design of the driving means is unimportant in the present case. A drive shaft 7 running from the driving means through the cover wall 6 of the top section 4 is visible in FIG. 1.

The food processor 1 is equipped with a food bowl 8, which can be positioned and secured on the cover wall 6 of the top section 4, although this will not be described in greater detail here. The food bowl 8 has a base wall 9 and a hollow-cylindrical side wall 10. Projecting from the base wall 9 is a column-shaped internal section 11, which has an internally located tube 12 through which the drive shaft 7 is introduced. The drive shaft 7 serves for driving the tools of the food processor 1 and, to this end, is coupled with an essentially circular-disk shaped holder 13 for holding the tools, so that the holder 13 can be driven in rotation around a holder axis 14. The holder 13 is hereby placed on the column-shaped internal section 11 of the food bowl 8.

To close the food bowl 8, a lid 15 is provided for the food bowl 8. The lid 15 has a cover wall 16 and, projecting from the cover wall 16, a hollow-cylindrical side wall 17, with which side wall 17 the lid 15 sits on an edge 18 of the food bowl 8. Projecting from the cover wall 16 of the food bowl 8 is a feed tube 19, which is tubular in design and has a roughly oval-shaped cross-section, and which is closed by means of a removable cover 20. With the cover 20 removed, food can be introduced into the feed tube 19, wherein the introduced food, e.g. potatoes, carrots or cucumbers, comes into contact with the holder 13 and consequently with the tool held in an operating position by the holder 13, by means of which tool the fed-in food is processed, e.g. cut into strips, which strips are collected in the food bowl 8.

The food processor 1 is equipped with multiple tools, which will be described in greater detail below with reference to FIGS. 3 to 8.

As can be seen in FIGS. 2, 3, 6, 7 and 8, the holder 13 is essentially circular-disk shaped. The holder 13 is equipped with a disk-shaped holder wall 21 running at right-angles to the holder axis 14, which holder wall 21 is connected in its central area to a drive sleeve 22. Provided inside the drive sleeve 22 are engaging ribs 23, which can be coupled to drive ribs provided in the area of the free end of the drive shaft 7. In the peripheral area of the holder wall 21, the holder wall 21 is connected to a hollow-cylindrical side wall 24, providing the holder 13 with adequate mechanical stability. In the holder wall 21, the holder 13 is equipped with a window 25. One tool at a time, connected to the holder 13 and consequently held by the holder 13, can be positioned in the window 25.

In the case of the food processor 1, a total of three tools 26, 27 and 28 are combined to form a tool unit 29. The first tool 26 serves for cutting relatively thin strips. The second tool 27 serves for cutting relatively thick strips. The third tool 28 serves for grating. The tool unit 29 is designed to be relocatable in relation to the holder 13, so it is achieved that, from the tool unit 29, one tool at a time, 26 or 27 or 28, can be positioned in the window 25, and hereby, i.e. with a tool positioned in the window 25, e.g. with a first tool 26 positioned in the window 25, the other tools, e.g. the second tool 27 and the third tool 28, are aligned facing towards the holder wall 21 and are consequently covered by the holder wall 21 and are thereby stored without any additional measures, and are hereby very well protected from damage by means of the holder wall 21.

In order to fix the tool unit 29 to the holder 13, releasable fixing means 30 are provided. The fixing means 30 are equipped with a threaded sleeve 31, which is concentric in relation to the holder axis 14 and is connected to the holder 13 in one piece, and which threaded sleeve is equipped with a thread 32, which thread 32 does not, however, extend as far as the holder wall 21, so that the threaded sleeve 31 has a thread-free portion 33. The fixing means 30 are further equipped with a pressure sleeve 34 that encloses the threaded sleeve 31 over its thread-free portion 33 and can be relocated along the threaded sleeve 31. The fixing means 30 are further equipped with a screw nut 35 that can be relocated along the threaded sleeve 31 by means of a screwing operation. It should be mentioned that the holder 13, with its holder wall 21 and its side wall 24 and its drive sleeve 22 and its threaded sleeve 31, comprises one component made of plastic. The pressure sleeve 34 and the screw nut 35 are also made of plastic. The tool unit 29, on the other hand, is made of steel.

The holder 13 is equipped with a positioning surface 36 adjacent to the holder axis 14, which positioning surface 36 comprises multiple surface sections 37, each in the shape of a ring sector and arranged in a ring. The positioning surface 36 is inclined at an angle of inclination $\beta$ in relation to the holder wall 21. The tool unit 29 is equipped with a positioning ring 38, which is provided to interact with the inclined positioning surface 36 of the holder 13. The positioning ring 38 can be fixed by the fixing means 30 so as to rest against the inclined positioning surface 36. In order to ensure that one of the tools, 26, 27 or 28, can be positioned in the area of the window 25 and hereby then assume a position where its flat tool surface, equipped with the actual processing means, i.e. cutting elements, is flush with the holder wall 21, and that the other two tools, which are not used in this case, assume a position below the holder wall 21 without coming into contact with the holder wall 21, each of the tools 26 and 27 and 28 from the tool unit 29 is designed to be inclined at an angle of inclination $\beta$ in relation to the positioning ring 38 of the tool unit 29.

As is clearly evident, in particular from FIG. 2, the pressure sleeve 34 is equipped with a contact surface 39 inclined at an angle of inclination $\beta$ in relation to the holder wall 21 of the holder 13. The positioning ring 38 can be held against the inclined positioning surface 36 of the holder 13 by means of the contact surface 39 of the pressure sleeve 34. The holder 13 and the tool unit 29 are normally held together using the fixing means 30, resulting in the modular unit shown in FIGS. 2, 7 and 8. In the case shown, the first tool 26 is located in an operational position in the area of the window 25 in the holder wall 21. In order to bring one of the other two tools, 27 or 28, into its operational position, the fixing means 30 must be released. This is done by unscrewing the screw nut 35 along the threaded sleeve 31, as a result of which the pressure sleeve 34 is lifted from the positioning ring 38, so that the positioning ring 38 is released from the positioning surface 36 of the holder 13. As a result, following the releasing of the fixing means 30 from the holder 13, the tool unit 29 can be relocated essentially at right angles to the holder wall 21, wherein the positioning ring 38 can be relocated along the threaded sleeve 31. Subsequently, following the releasing of the fixing means 30 from the holder 13, the tool unit 29 can be relocated essentially parallel with the holder wall 21. In the present case, following the releasing of the fixing means 30, the tool unit 29 can essentially be rotated about the holder axis 14. As a result of a relocation or rotation of this kind of the tool unit 29, one of the other two tools, 27 and 28, may be brought into its operational position in the area of the window 25. As soon as the tool, 27 or 28, required by the user and therefore selected by him, has reached its operational position in the area of the window 25, the fixing means 30 are shifted, by screwing up the screw nut 35, back into their fixing position, in which fixing position the positioning ring 38 is again pressed against the positioning surface 36 of the holder 13 by means of the pressure sleeve 34 and the screw nut 35.

The invention is not restricted to the embodiment described above. The fixing of the tool unit 29 to the holder 13 may also be accomplished using differently designed fixing means, e.g. using latching means or a clamping ring. The holder 13 may also be driven via the threaded sleeve 31, wherein suitable driving means are then provided in the threaded sleeve 31. A second tool unit with multiple tools may also be provided in a food processor 1 as shown in FIG. 1.

The measures in accordance with the invention may also be applied in a food processor in which the driving of the tool unit and the holder to hold the tool unit, does not originate from the base of the food bowl, but uses a drive device accommodated in a lid-type apparatus placed on top of the food bowl.

The invention claimed is:

1. A food processor equipped with at least two tools for processing food, the food processor comprising:
    driving means for driving the tools
    a holder for holding the tools, which holder can be driven by the driving means and which holder is equipped with a holder wall and which holder has a window in the holder wall, in said window the tools held by the holder can be positioned one at a time,
    wherein the at least two tools are combined to form a tool unit,
    wherein the tool unit is relocatable in relation to the holder,
    wherein one tool at a time from the tool unit can be positioned in the window, in which case the at least one other tool from the tool unit is aligned facing towards the holder wall and covered by the holder wall, and
    wherein a fixing means is provided for fixing the tool unit to the holder.

2. The food processor as claimed in claim 1, wherein the tool unit can be relocated essentially parallel with the holder wall following a releasing of the fixing means in relation to the holder.

3. The food processor as claimed in claim 2, wherein the tool unit is relocatable essentially at right angles to the holder wall following a releasing of the fixing means in relation to the holder.

4. The food processor as claimed in claim 2, wherein the holder is drivable by the driving means so as to rotate about a holder axis, and has a holder wall running at right angles to the holder axis, and wherein, following a releasing of the fixing means, the tool unit is rotatable about the holder axis.

5. The food processor as claimed in claim 4, wherein the holder is equipped with a positioning surface adjacent to the holder axis, which positioning surface is inclined in relation to the holder wall by an angle of inclination, and wherein the tool unit comprises a positioning ring to interact with the inclined positioning surface of the holder, and wherein the positioning ring can be fixed with the fixing means so as to rest against the inclined positioning surface, and wherein each tool from the tool unit is inclined at the angle of inclination in relation to the positioning ring.

6. The food processor as claimed in claim 5, wherein the fixing means comprises:
    a threaded sleeve that is concentric with the holder axis and is connected to the holder,
    a pressure sleeve that encloses the threaded sleeve and is relocatable along the threaded sleeve, and
    a screw nut that is relocatable along the threaded sleeve by means of a screwing operation,
    wherein the pressure sleeve is equipped with a contact surface inclined by the angle of inclination in relation to the holder wall, and
    wherein, with the aid of the contact surface of the pressure sleeve, the positioning ring can be held against the inclined positioning surface of the holder.

7. The food processor as claimed in claim 4, wherein the tool unit comprises three tools.

8. A food processor comprising:
    a plurality of tools configured to process food;
    a holder comprising a holder wall and a window in the holder wall, wherein the holder is configured to hold the plurality of tools in said window one at a time,
    a driver configured to drive the holder and the plurality of tools;
    wherein the plurality of tools are combined to form a tool unit,
    wherein the tool unit is relocatable in relation to the holder, and
    wherein one at a time of the plurality of tools from the tool unit is positionable in the window, while other ones of the plurality of tools from the tool unit are aligned facing towards the holder wall and are covered by the holder wall.

9. The food processor as claimed in claim 8, comprising a fixing device configured to fix the tool unit to the holder.

10. The food processor as claimed in claim 9, wherein the tool unit is configured to be relocatable to a position essentially parallel with the holder wall following a releasing of the fixing device in relation to the holder.

11. The food processor as claimed in claim 9, wherein the tool unit is configured to be relocatable to a position essentially at right angles to the holder wall following a releasing of the fixing device in relation to the holder.

12. The food processor as claimed in claim 2, wherein the holder is drivable by the driver to rotate about a holder axis, and wherein the holder wall is configured at right angles to the holder axis, and wherein, following a releasing of the fixing device, the tool unit is rotatable about the holder axis.

13. The food processor as claimed in claim 4, wherein the holder is equipped with a positioning surface adjacent to the holder axis, which positioning surface is inclined in relation to the holder wall by an angle of inclination, and wherein the tool unit comprises a positioning ring to interact with the inclined positioning surface of the holder, and wherein the positioning ring can be fixed with the fixing means so as to rest against the inclined positioning surface, and wherein each tool of the plurality of tools from the tool unit is inclined at the angle of inclination in relation to the positioning ring.

14. The food processor as claimed in claim 5, wherein the fixing means comprises:
 a threaded sleeve that is concentric with the holder axis and is connected to the holder,
 a pressure sleeve that encloses the threaded sleeve and is relocatable along the threaded sleeve, and
 a screw nut that is relocatable along the threaded sleeve by means of a screwing operation,
 wherein the pressure sleeve is equipped with a contact surface inclined by the angle of inclination in relation to the holder wall, and
 wherein, with the aid of the contact surface of the pressure sleeve, the positioning ring can be held against the inclined positioning surface of the holder.

15. The food processor as claimed in claim 4, wherein the tool unit comprises three tools.

\* \* \* \* \*